United States Patent
Barrs et al.

(10) Patent No.: US 7,565,645 B2
(45) Date of Patent: Jul. 21, 2009

(54) METHOD AND APPARATUS FOR MARKING CODE FOR DATA VERSIONING

(75) Inventors: John William Barrs, Austin, TX (US); Michael Wayne Brown, Georgetown, TX (US); Paul Stuart Williamson, Round Rock, TX (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 232 days.

(21) Appl. No.: 11/037,322

(22) Filed: Jan. 18, 2005

(65) Prior Publication Data

US 2006/0161913 A1 Jul. 20, 2006

(51) Int. Cl.
G06F 9/45 (2006.01)
G06F 9/44 (2006.01)
G06F 17/30 (2006.01)

(52) U.S. Cl. .................. 717/130; 717/127; 717/128; 707/203

(58) Field of Classification Search ............... 717/130, 717/127, 128; 707/203
See application file for complete search history.

(56) References Cited

U.S. PATENT DOCUMENTS

| | | | |
|---|---|---|---|
| 5,029,125 A | 7/1991 | Sciupac | |
| 5,347,653 A * | 9/1994 | Flynn et al. | 707/203 |
| 5,371,675 A | 12/1994 | Greif et al. | |
| 5,574,898 A * | 11/1996 | Leblang et al. | 707/1 |
| 5,603,024 A | 2/1997 | Goldring | 395/619 |
| 5,757,372 A | 5/1998 | Krause et al. | 345/348 |
| 5,806,078 A * | 9/1998 | Hug et al. | 707/203 |
| 5,893,908 A | 4/1999 | Cullen et al. | |
| 5,924,096 A | 7/1999 | Draper et al. | 707/10 |
| 5,946,699 A | 8/1999 | Sawashima et al. | |
| 5,970,496 A | 10/1999 | Katzenberger | |
| 6,105,040 A | 8/2000 | Agesen | |
| 6,125,371 A * | 9/2000 | Bohannon et al. | 707/203 |
| 6,161,200 A * | 12/2000 | Rees et al. | 717/130 |
| 6,286,016 B1 | 9/2001 | Heller et al. | |
| 6,314,567 B1 | 11/2001 | Oberhauser et al. | |
| 6,332,300 B1 | 12/2001 | Wakai | |
| 6,418,485 B1 | 7/2002 | Cooper et al. | |

(Continued)

FOREIGN PATENT DOCUMENTS

JP 10040151 2/1998

OTHER PUBLICATIONS

West, et al. "Automatic Incremental State Saving", 1996, IEEE, p. 78-85.*

(Continued)

*Primary Examiner*—Li B Zhen
(74) *Attorney, Agent, or Firm*—Yee & Associates, P.C.; Carlos Munoz-Bustamante (57) ABSTRACT

A method, apparatus, and computer instructions for marking data versioning for code. Responsive to receiving an application programming interface call, a first marking statement in the code and a second marking statement are inserted in the code. A portion of code between the first marking statement and the second marking statement forms a marked section of code. A change made in data in an object caused by execution of the marked portion of code is detected. The detected change is tracked in manner such that the object may be restored to a prior state.

14 Claims, 5 Drawing Sheets

U.S. PATENT DOCUMENTS

| | | | |
|---|---|---|---|
| 6,442,661 | B1 | 8/2002 | Dreszer |
| 6,463,526 | B1 | 10/2002 | Chaudhry et al. |
| 6,510,522 | B1 | 1/2003 | Heinrich et al. |
| 6,594,744 | B1 | 7/2003 | Humlicek et al. |
| 6,658,489 | B1 | 12/2003 | Asselin |
| 6,678,712 | B1 | 1/2004 | McLaren et al. |
| 6,721,944 | B2 * | 4/2004 | Chaudhry et al. ........... 717/154 |
| 6,725,241 | B1 | 4/2004 | Rodriguez et al. |
| 6,850,964 | B1 | 2/2005 | Brough et al. |
| 6,856,993 | B1 | 2/2005 | Verma et al. |
| 7,058,667 | B2 | 6/2006 | Goldick |
| 7,167,881 | B2 | 1/2007 | Yasuda et al. |
| 7,213,246 | B1 | 5/2007 | van Rietschote et al. |
| 7,251,810 | B1 * | 7/2007 | Nolte ......................... 717/130 |
| 2002/0059328 | A1 | 5/2002 | Watkins ....................... 707/203 |
| 2002/0065799 | A1 | 5/2002 | West et al. |
| 2002/0073415 | A1 | 6/2002 | Kim et al. |
| 2002/0103814 | A1 | 8/2002 | Duvillier et al. |
| 2002/0107886 | A1 | 8/2002 | Gentner et al. .............. 707/511 |
| 2002/0108025 | A1 | 8/2002 | Shaylor |
| 2003/0041179 | A1 | 2/2003 | Snead et al. |
| 2003/0074378 | A1 | 4/2003 | Midgley et al. |
| 2003/0088866 | A1 | 5/2003 | Boldon et al. |
| 2003/0120529 | A1 | 6/2003 | Honarvar et al. |
| 2003/0158861 | A1 | 8/2003 | Sawdon et al. |
| 2003/0204712 | A1 | 10/2003 | Inui et al. |
| 2004/0019652 | A1 | 1/2004 | Freimuth et al. |
| 2004/0044702 | A1 | 3/2004 | Ferreira Alves et al. |
| 2005/0198236 | A1 | 9/2005 | Byers et al. |
| 2005/0256912 | A1 | 11/2005 | Krishnan et al. |
| 2005/0278393 | A1 | 12/2005 | Huras et al. |
| 2006/0070089 | A1 | 3/2006 | Shoaib et al. |

OTHER PUBLICATIONS

Tikir, et al. "Efficient Instrumentation for Code Coverage Testing", 2002, ACM, p. 86-96.*

IBM Technical Disclosure Bulletin, vol. 36, No. 10, Oct. 1993, "Change Flagging Delta System", pp. 331-333.

Makki et al., "A New Storage Organization for Temporal Data Bases", J. Systems Software, 1994; 27:159-169.

Koeller et al., "History Driven View Synchronization", Dept. of Comput. Sci., Worcester Polytech. Inst., MA, USA, Abstract, 2000, pp. 168-177.

Rho et al., "An Operation-Based Model of Version Storage and Consistency Management for Fine-Grained Software Objects", Journal of KISS: Software and Applications, vol. 27, No. 7, pp. 691-701, 2000.

Barrs et al., Method and Apparatus for Dimensional Data Versioning and Recovery Management.

Barrs et al., Method and Apparatus for Data Versioning and Recovery Using Delta Content Save and Restore Management.

Barrs et al., Platform Infrastructure to Provide an Operating System Based Application Programming Interface Undo Service.

Barrs et al., Virtual Memory Management Infrastructure for Monitoring Deltas and Supporting Undo Versioning in a Paged Memory System.

Barrs et al., Infrastructure for Device Driver to Monitoring and Trigger Versioning for Resources.

Barrs et al., Method and Apparatus for Managing Versioning Data in a Network Data Processing System.

Barrs et al., Heap Manager and Application Programming Interface Support for Managing Versions of Objects.

Barrs et al., Object Based Access Application Programming Interface for Data Versioning.

* cited by examiner

METHOD AND APPARATUS FOR MARKING CODE FOR DATA VERSIONING

CROSS REFERENCE TO RELATED APPLICATIONS

The present invention is related to the following patent applications: entitled "Method and Apparatus for Dimensional Data Versioning and Recovery Management", Ser. No. 11/037,127, entitled "Method and Apparatus for Data Versioning and Recovery Using Delta Content Save and Restore Management", Ser. No. 11/037,157, entitled "Platform Infrastructure to Provide an Operating System Based Application Programming Interface Undo Service", Ser. No. 11/037,267, entitled "Virtual Memory Management Infrastructure for Monitoring Deltas and Supporting Undo Versioning in a Paged Memory System", Ser. No. 11/037,000, entitled "Infrastructure for Device Driver to Monitor and Trigger Versioning for Resources", Ser. No. 11/037,268, entitled "Method and Apparatus for Managing Versioning Data in a Network Data Processing System", Ser. No. 11/037,001; entitled "Heap Manager and Application Programming Interface Support for Managing Versions of Objects", Ser. No. 11/037,024, and entitled "Object Based Access Application Programming Interface for Data Versioning", Ser. No. 11/037,145, filed even date hereof, assigned to the same assignee, and incorporated herein by reference.

BACKGROUND OF THE INVENTION

1. Technical Field

The present invention relates to an improved data processing system and in particular to a method, apparatus, and computer instructions for processing data. Still more particularly, the present invention relates to a method, apparatus, and computer instructions for managing versions of objects.

2. Description of Related Art

Data storage components, variables, collections, and multi-dimensional collections are used throughout all computer applications. During the execution of an application, the contents of these types of data storage elements will change or evolve. These changes occur due to modifications or updates to the data. These changes may be made by user input or through programmatic means. As the program logic of an application progresses, situations often arise in which the program state and the content of the data storage elements need to be reset to a prior state. This state may be an arbitrary state selected by the user or programmatically by an application. Mechanisms for incrementally saving and resetting data to a prior known state are present in many applications.

Currently available mechanisms are found in applications, such as word processors, for resetting or rolling back to a previous state. A word processor may allow a user to undo changes to a document, such as deletions, insertions, or formatting changes.

A significant problem with existing mechanisms is that they are prone to inefficiencies and require explicit management by the application programmer or end user. Therefore, it would be advantageous to have an improved method, apparatus, and computer instructions for data versioning and recovery management.

SUMMARY OF THE INVENTION

The present invention provides a method, apparatus, and computer instructions for marking data versioning for code. Responsive to receiving an application programming interface call, a first marking statement in the code and a second marking statement are inserted in the code. A portion of code between the first marking statement and the second marking statement forms a marked section of code. A change made in data in an object caused by execution of the marked portion of code is detected. The detected change is tracked in manner such that the object may be restored to a prior state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
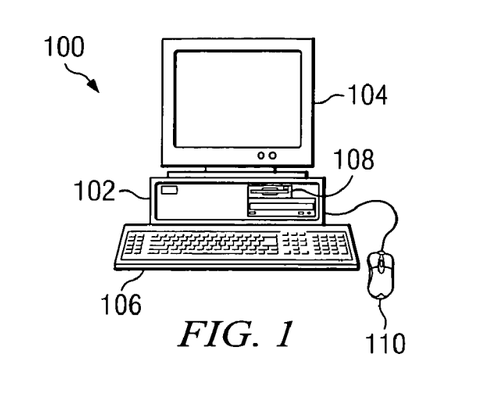
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. Computer 100 is depicted which includes system unit 102, video display terminal 104, keyboard 106, storage device 108, which may include floppy drives and other types of permanent and removable storage media, and mouse 110. Additional input devices may be included with personal computer 100, such as, for example, a joystick, touch pad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
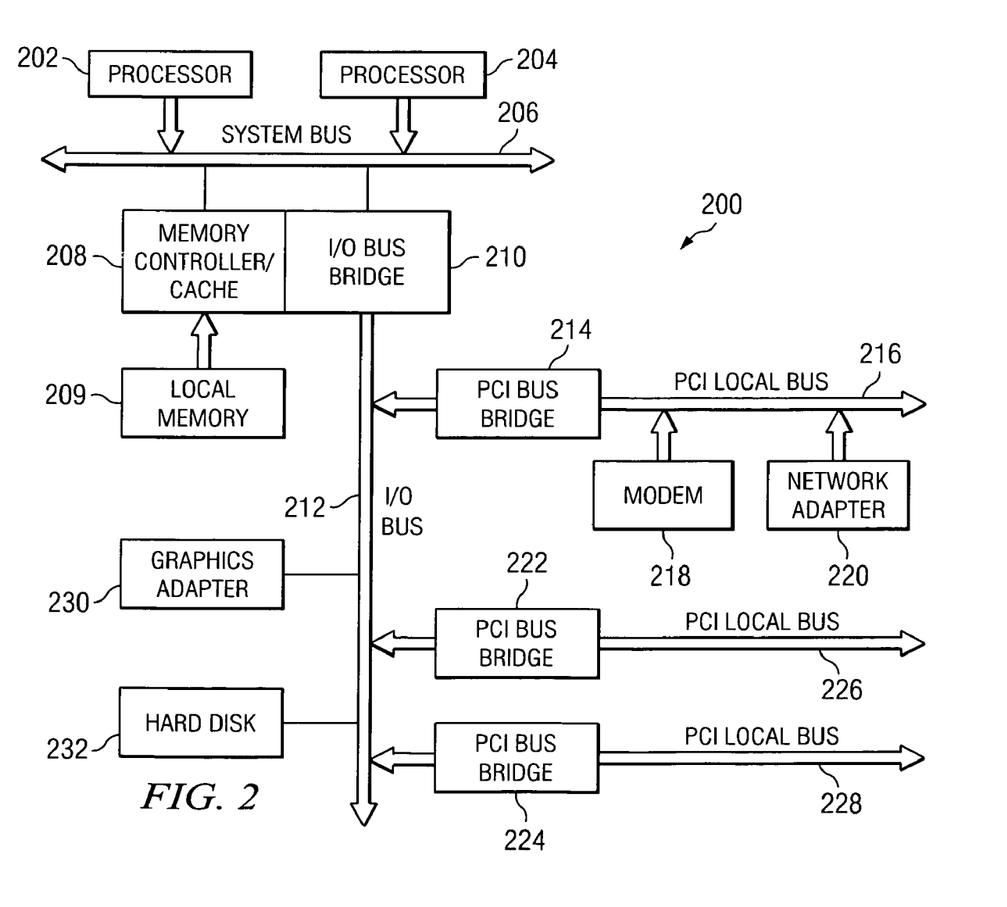
FIG. 2 is a block diagram of a data processing system in which the present invention may be implemented.

Referring to FIG. 2, a block diagram of a data processing system in which the present invention may be implemented. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bridge 210 is connected to system bus 206 and provides an interface to I/O bus 212. Memory controller/cache 208 and I/O bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to other data processing systems may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
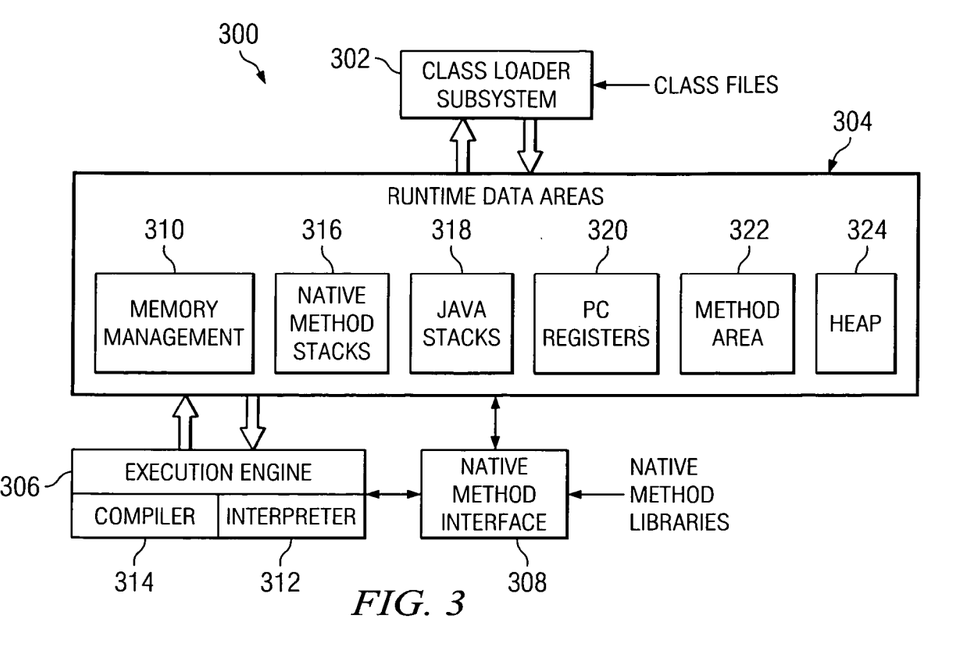
FIG. 3 is a block diagram of a JVM™ in accordance with a preferred embodiment of the present invention.

With reference now to FIG. 3, a block diagram of a JAVA™ virtual machine (JVM) is depicted in accordance with a preferred embodiment of the present invention. JVM 300 includes class loader subsystem 302, which is a mechanism for loading types, such as classes and interfaces, given fully qualified names. JVM 300 also contains runtime data areas 304, execution engine 306, native method interface 308, and memory management 310. Execution engine 306 is a mechanism for executing instructions contained in the methods of classes loaded by class loader subsystem 302. Execution engine 306 may be, for example, Java interpreter 312 or just-in-time compiler 314. Native method interface 308 allows access to resources in the underlying operating system. Native method interface 308 may be, for example, the Java Native Interface (JNI).

Runtime data areas 304 contain native method stacks 316, Java stacks 318, PC registers 320, method area 322, and heap 324. These different data areas represent the organization of memory needed by JVM 300 to execute a program.

Java stacks 318 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well defined for a variety of platform architectures.

Program counter (PC) registers 320 are used to indicate the next instruction to be executed. Each instantiated thread gets its own PC register and Java stack. If the thread is executing a JVM method, the value of the PC register indicates the next instruction to execute. If the thread is executing a native method, then the contents of the PC register are undefined. Native method stacks 316 stores the state of invocations of native methods. The state of native method invocations is stored in an implementation-dependent way in native method stacks, registers, or other implementation-dependent memory areas. In some JVM implementations, native method stacks 316 and Java stacks 318 are combined.

Method area 322 contains class data while heap 324 contains all instantiated objects. A heap is an area of memory reserved for data that is created at runtime. The constant pool is located in method area 322 in these examples. The JVM specification strictly defines data types and operations. Most JVMs choose to have one method area and one heap, each of which is shared by all threads running inside the JVM, such as JVM 300. When JVM 300 loads a class file, it parses information about a type from the binary data contained in the class file. JVM 300 places this type of information into the method area. Each time a class instance or array is created, the memory for the new object is allocated from heap 324. JVM 300 includes an instruction that allocates memory space within the memory for heap 324 but includes no instruction for freeing that space within the memory. Memory management 310 in the depicted example manages memory space within the memory allocated to heap 324. Memory management 310 may include a garbage collector, which automatically reclaims memory used by objects that are no longer referenced. Additionally, a garbage collector also may move objects to reduce heap fragmentation.

The present invention provides a memory management subsystem to provide for data versioning and recovery management for objects in a heap. The mechanism of the present invention saves modifications or deltas in data when objects in memory are changed. A delta in data is the difference between the data in its prior version and its current version. The different deltas may be used to restore objects to a prior state. These deltas also are referred to as delta data. In these illustrative examples, the memory management subsystem may include, for example, memory management 310 and heap 324 in FIG. 3.

The mechanism of the present invention modifies this heap to include objects for restoring delta data. In these examples, delta data represents change values or data for a particular memory object. This delta data is associated with an index. This index may take various forms, such as a number or a timestamp. In particular, these changes are stored in a data structure, for example, a linked list in a heap. The mechanism of the present invention modifies the memory management system to automatically generate this linked list in the heap of a JVM without requiring any special requests from applications or the user. Alternatively, the objects may be allocated in the heap to include the delta data.

In particular, these changes between the prior data and the current data in its changed form are stored in a data structure, such as, for example, a linked list in a heap. The data structure is associated with a memory object. In the illustrative examples, a memory object is associated with the versioning data structure using at least one of a pointer and an offset. The mechanism of the present invention modifies the memory management system to automatically generate this linked list in the heap of a JVM without requiring any special requests from applications or the user.

Figure 4:
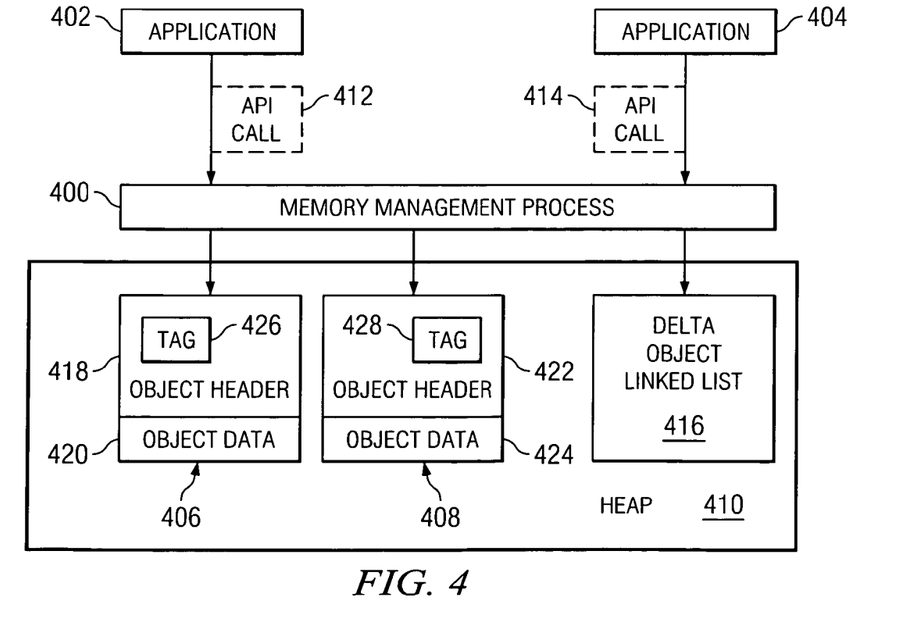
FIG. 4 is a diagram illustrating components used in data versioning and recovery in accordance with a preferred embodiment of the present invention.

Turning now to FIG. 4, a diagram illustrating components used in data versioning and recovery is depicted in accordance with a preferred embodiment of the present invention. Memory management process 400 receives requests from applications, such as application 402 and application 404 to allocate objects, such as objects 406 and 408. Memory management process 400 may be implemented in a memory management component, such as memory management 310 in JVM 300 in FIG. 3.

In these examples, the requests from application 402 and application 404 take the form of application programming interface (API) call 412 and API call 414. An API is a language and message format used by an application program to communicate with the operating system. APIs are implemented by writing function calls in the program, which provide the linkage to the required subroutine for execution. If these API calls include an argument or parameter indicating that delta data should be stored for restoring prior versions of an object, objects 406 and 408 are allocated in a manner to allow for versioning of the objects to occur. In other words, changes in data in these objects are stored in a manner to allow the objects to be restored to a prior version.

In these illustrative examples, this delta data is maintained using delta object linked list 416, which is a data structure located within heap 410. This list is allocated by memory management process 400. This particular data structure contains a linked list of entries that identify delta data for various objects, such as object 406 and object 408.

In this example, object 406 includes object header 418 and object data 420. Object 408 includes object header 422 and object data 424. Object data 420 and object data 424 contain the data for the object in its current state. Object header 418 includes a pointer or offset to delta object linked list 416. In a similar fashion, object header 422 also includes a pointer or offset in the delta object linked list 416.

In allocating object 406 and 408, memory management process 400 also includes an indicator or tag with object headers 418 and 422. As depicted, object header 418 contains tag 426, and object header 422 contains tag 428. These indicators or tags are used to identify objects 406 and 408 as objects for which delta data will be stored to allow restoring these objects to a prior state.

When application 402 changes an object, such as object 406, memory management process 400 creates an entry within delta object linked list 416 to store the delta data. Specifically, any changed values in object 406 are stored within delta object linked list 416 in association with the identification of object 406 and an index, such as a numerical value or a timestamp.

This change in data may be stored every time an object is changed. Alternatively, the changes may be stored only when an application changes the data through an API call that includes an additional parameter or argument that indicates that the change is to occur. An example of an API call is set_version (object reference, object version). The object reference is the identification of the object, and the object version provides an identifier. Alternatively, the object version may be excluded from the call. In this case, memory management process 400 may generate a version identifier to return to the application making the call.

In this manner, all changes to object 406 are stored within delta object linked list 416. Thus, object 406 may be returned to any prior state desired using this data structure.

If a request is received by memory management process 400 to restore one of the objects in the heap to a prior state, the process identifies the object and an index to identify the state that is desired. An example of an API call is restore_version (object reference, object version). The object reference is a pointer to the object that is to be restored. The object version is an index used to identify the version of the object that is to be restored.

This index may be, for example, a numerical value or a timestamp. If, for example, object 406 is identified in the request, the object header is used to find delta object linked list 416. The index in the request is used to identify the desired state for object 406. Based on the particular entry identified in delta object linked list 416, the linked list may be traversed to make the appropriate changes to object 406 to return that object to its original state.

In these depicted examples, all of the delta data for all objects is stored within delta object linked list 416. The entries that apply to a particular object may be identified through an object identifier that is found within each entry of delta object linked list 416.

In other illustrative examples, a separate linked list data structure may be used for each object. In this case, the object header provides an offset to the particular linked list data structure for that object.

Figure 5:
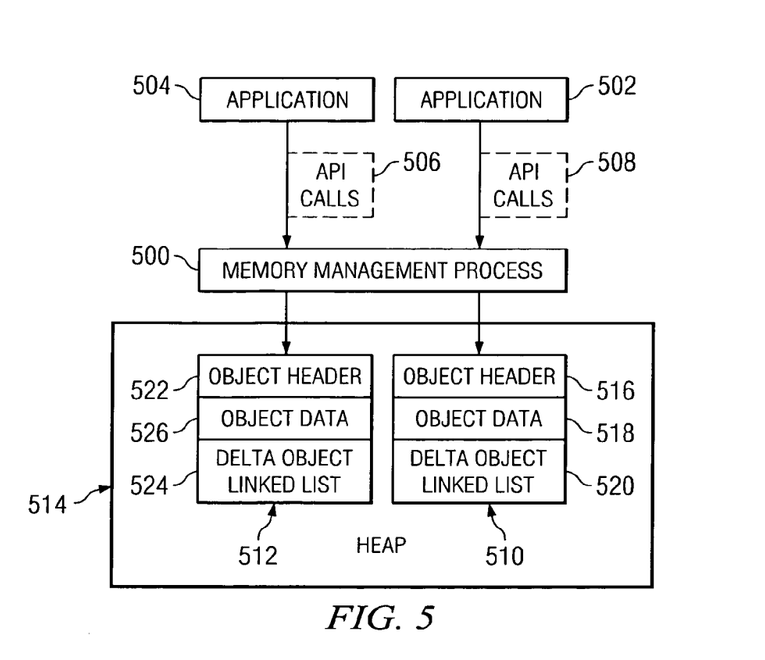
FIG. 5 is a diagram illustrating components used in providing data versioning and recovery management in accordance with a preferred embodiment of the present invention.

Turning next to FIG. 5, a diagram illustrating components used in providing data versioning and recovery management is depicted in accordance with a preferred embodiment of the present invention. In this example, the versioning data, also referred to as delta data, is stored within the objects.

In this illustrative example, memory management process 500 receives requests from application 502 and application 504 in the form of API calls 506 and 508 to create objects 510 and 512 for use by the applications. In this example, object 510 is created for use by application 502, and object 512 is created for use by application 504. Memory management process 500 may be implemented within memory management 310 in FIG. 3. In these examples, objects 510 and 512 contain delta data that allows these objects to be restored to a prior version or state.

Objects 510 and 512 are located in heap 514. Object 510 includes object header 516, object data 518, and delta object linked list 520. Object header 516 includes an offset to point to the beginning of delta object linked list 520 in this illustrative example. Object data 518 contains the current data for object 510. Delta object linked list 520 contains entries that identify all of the delta data for object 510. In a similar fashion, object header 522 provides an offset to the beginning of delta object linked list 524. Object data 526 contains the current data for object 512. Delta object linked list 524 contains all the delta data for changes made to object data 526. These types of objects are created when a call to allocate an object includes an additional parameter or argument that indicates that the object should be restorable to a prior state. If this additional argument or parameter is missing, the object s allocated normally.

In this illustrative example, memory management process 500 automatically increases the size of object 510 in response to a request to allocate object 510 in which the request includes an indication that that object 510 is to store data needed to restore object 510 to a prior version or state. This increased size includes space needed to store the delta data.

In addition to allocating these objects in response to a specific call requesting data versioning for the objects, this type of allocation for objects 510 and 512 may be performed automatically without requiring an application or a user to request the additional memory to store delta data. Additionally, memory management process 500 may allocate more space for object 510 and object 512 as the object data and the delta data increase for these objects.

In this particular illustrative embodiment, these objects may be moved and copied such that the delta data automatically is moved or copied with the objects. In this manner, an object may be saved and reloaded at a later time with its delta data intact. In this fashion, an object may be restored to a prior state at any time without having to locate or save data objects from the heap and restore those objects separately.

Figure 6:
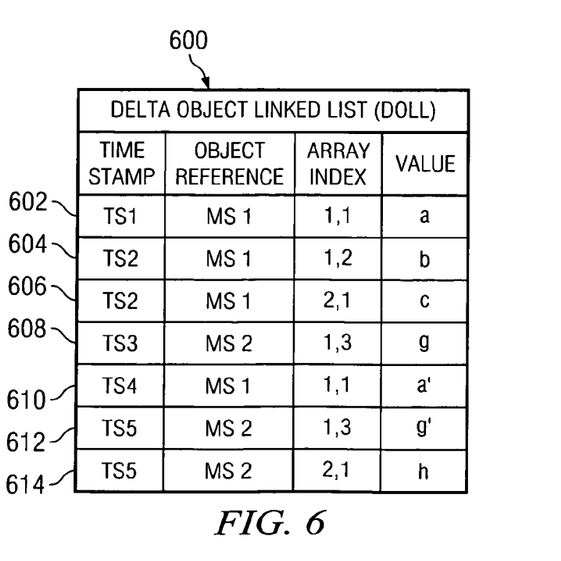
FIG. 6 is a diagram illustrating a delta object linked list in accordance with a preferred embodiment of the present invention.

Turning now to FIG. 6, a diagram illustrating a delta object linked list is depicted in accordance with a preferred embodiment of the present invention. In the depicted example, delta object linked list 600 is an example of delta object linked list 416 as created by memory management process 400 in FIG. 4.

In these illustrative examples, delta object linked list 600 contains entries 602, 604, 606, 608, 610, 612, and 614. As shown, each of these entries contains a time stamp, an object reference, an array index, and a value. The time stamp indicates when the entry was made. The object reference is the pointer to the object for the entry. The array index identifies the location in which data has changed, and the value indicates the change in the data at that location.

In this illustrative example, the prior state is identified through a timestamp. If the memory management subsystem receives a request identifying a particular timestamp and object, the object may be returned to that state. Entry 614 is the most recent entry, while entry 602 is the oldest entry. Entries 602, 604, 606, and 610 are entries for one object, MS 1. Entries 608, 612, and 614 are entries for another object, MS 2. The mechanism of the present invention traverses the linked list from the most current entry to the entry identified by the timestamp. Entries for objects other than the selected object are ignored.

This type of traversal and restoration of data is provided as one manner in which an object may be restored to a prior state. Of course, any process used to return an object to a prior state using delta data may be employed in these illustrative examples.

The delta in data may be identified or calculated in a number of different ways. In these examples, the delta data may be calculated using an exclusive OR (XOR). In other words, the value of prior data may be XOR'd with the value of the current data to identify the change in the current data as compared to the prior data. The result of this function is considered the delta in the data in this example. With this delta the current data may be restored to the value of the current data. The data may be, for example, the values for data in all of the heaps managed by a memory management system. The delta in the data also may be calculated using Moving Picture Experts Group processes, such as MPEG 2. With these processes every delta is similar to a video frame with respect to normal use in processing video data. Instead, the deltas are for one or more memory segments. As with a video, in which not every pixel necessarily changes from frame to frame, not all of the data elements within a memory segment may change from one delta to another delta. Compression algorithms, similar to MPEG2, can be employed which minimize the amount of memory required to store the necessary information, or delta, to restore the memory segments to prior values.

Figure 7:
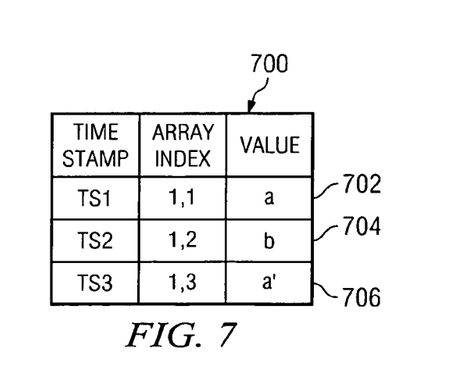
FIG. 7 is a diagram of a delta object linked list in accordance with a preferred embodiment of the present invention.

Turning next to FIG. 7, a diagram of a delta object linked list is depicted in accordance with a preferred embodiment of the present invention. Delta object linked list 700 is an example a list that is found in an object. In particular, delta object link list may be implemented as delta object linked list 520 in object 510 in FIG. 5.

As shown, delta object linked list 700 includes entries 702, 704, and 706. Each entry includes a time stamp, an array index, and a value. An object reference is not included in this list as with delta object linked list 600 in FIG. 6 because this list is contained within the object for which changes in data, delta data, is stored.

Although FIGS. 6 and 7 specificy types of changes in data in which an array is used to identify where changes in data has occurred, any type of system may be used to identify changes in data.

Additionally, the mechanism of the present invention allows for portions of code to be marked in which objects on the marked portions are tracked for changes. This mechanism is implemented in a memory management process, such as memory management process 500 in FIG. 5.

Figure 8:
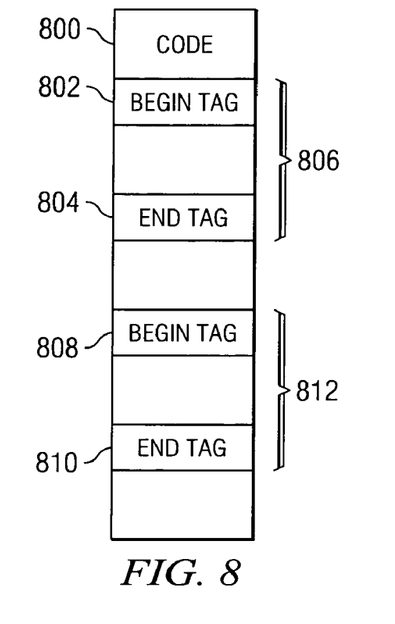
FIG. 8 is a diagram illustrating marked code in accordance with a preferred embodiment of the present invention.

In FIG. 8, a diagram illustrating marked code is depicted in accordance with a preferred embodiment of the present invention. Code 800 is marked using begin tag 802 and end tag 804 to create marked portion 806. Additionally, begin tag 808 and end tag 810 define marked portion 812.

Any alterations or changes to objects in marked portion 806 and marked portion 812 are tracked in the manner described above. This type of tracking does not require calls to be made by the application to identify particular objects. With this marking mechanism, the speed of execution in a data processing system is increased because only objects of interest are versioned instead of all objects when data changes during execution of code.

Figure 9:
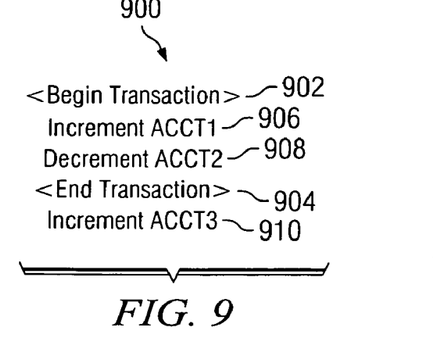
FIG. 9 is an example of marked code in accordance with a preferred embodiment of the present invention.

With reference to FIG. 9, an example of marked code is depicted in accordance with a preferred embodiment of the present invention. Code 900 is an example of marked portion of code, such as marked portion 806 in FIG. 8. Line 902 is an example of a begin tag, while line 904 is an example of an end tag. Line 906 and line 908 contain instructions that alter objects.

When line 902 is encountered during the execution of code 900, any changes to objects are tracked. Execution of line 906 results in the changes to object ACCT1 being tracked. In other words, the change is stored in a data structure such as delta object linked list 700 in FIG. 7. In this manner, this object may be restored to a prior version or state. Execution of line 908 results in a similar storing of data for object ACCT2. When line 904 is encountered tracking changes to objects no longer occurs when execution of line 910 occurs incrementing the object ACCT3.

The tags illustrated in FIGS. 8 and 9 may be placed in to the code using different mechanisms. For example, a programmer may manually insert these tags through a user interface. Alternatively, the user interface may allow a user to select a portion of a code, such as a class or set of classes. In this example, the user enters the name of the class and the memory management process locates and inserts tags around the class.

Figure 10:
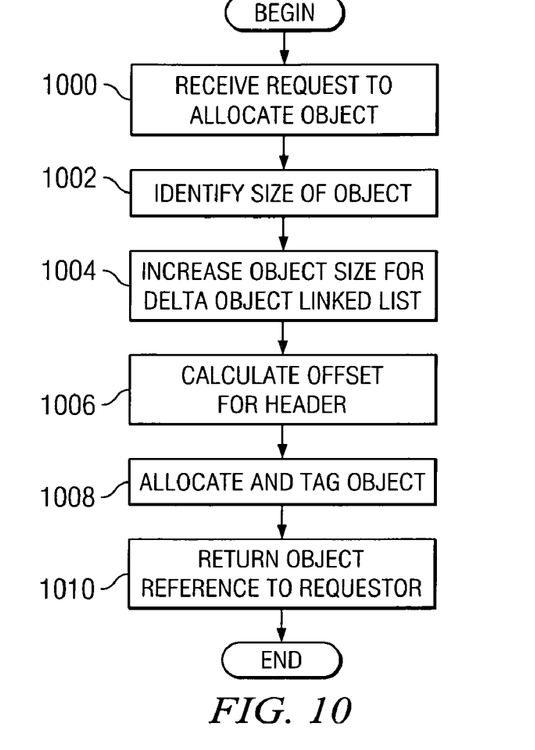
FIG. 10 is a flowchart of a process for allocating objects in accordance with a preferred embodiment of the present invention.

Turning now to FIG. 10, a flowchart of a process for allocating objects is depicted in accordance with a preferred embodiment of the present invention. The process illustrated in FIG. 10 may be implemented in a memory management process, such as memory management process 400 in FIG. 4.

The process begins by receiving a request to allocate an object (step 1000). In these examples, the request is received from an application, such as application 402 in FIG. 4, in the form of an API call to the JVM. In response, the size of the object is identified (step 1002). Several options exist as to where, in memory, to place the delta object linked list. The consideration of which option to choose is based upon tradeoffs in performance and or memory usage. In a preferred, performance optimized embodiment, the delta object linked list is co-resident in memory with the data element for which it contains delta information. In this case, at object creation, memory is allocated sufficient to contain both the data element and an estimated size for the delta object linked list. In these examples, the estimated size being calculated primarily by the number of deltas desired to be retained. The object size for the object is increased to include the delta object linked list (step 1004).

Next, an offset is calculated and stored in the object header (step 1006). This offset is used by the memory management subsystem to point to the delta object linked list. The object is then allocated and tagged (step 1008). The object is tagged by including a tag or indicator within the object. This tag or indicator is used to identify the object as one in which delta data is stored for versioning. An object reference is then returned to the requestor (step 1010). This object reference is by the requester to write or read the object.

At this point, the requester may access the allocated object. In these illustrative examples, step 1004 may be an optional step depending on the particular implementation. In the instance in which the delta object linked list is allocated as a separate data structure from the object, this step may be skipped.

Figure 11:
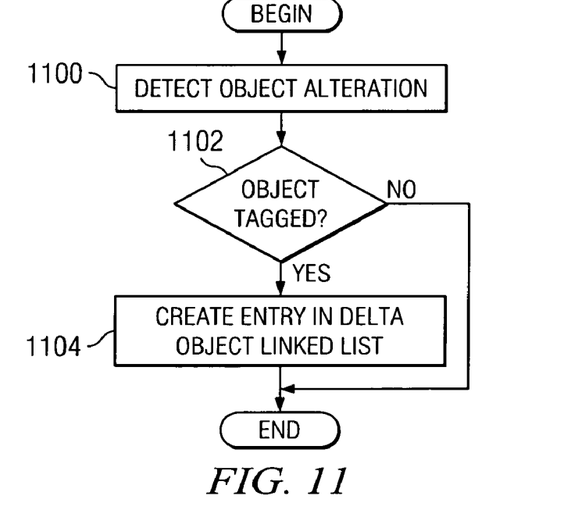
FIG. 11 is a flowchart of a process for storing delta data in accordance with a preferred embodiment of the present invention.

Turning now to FIG. 11, a flowchart of a process for storing delta data is depicted in accordance with a preferred embodiment of the present invention. The process illustrated in FIG. 11 may be implemented in a memory management process, such as memory management process 400 in FIG. 4.

The process begins by detecting an alteration of the data in the object (step 1100). This step may occur in different ways; for example, when the memory management process receives a request to change data in an object. When that change is processed, a determination is made as to whether the object is tagged (step 1102). The tag is used to indicate whether the object is set up such that changes in data can be stored for the object. If the object is tagged, an entry is created in the delta object linked list (step 1104) with the process terminating thereafter. Otherwise the process terminates without storing the delta data. The linked list in step 1104 may be a combined linked list for all objects being managed. Alternatively, the linked list may be one that was created within the object when the object was allocated or as a separate linked list associated with the object.

Figure 12:
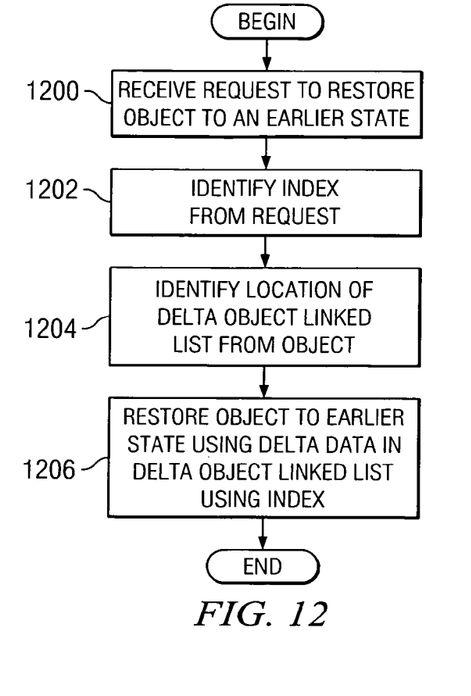
FIG. 12 is a flowchart of a process for returning an object to an earlier state in accordance with a preferred embodiment of the present invention.

Turning now to FIG. 12, a flowchart of a process for returning an object to an earlier state is depicted in accordance with a preferred embodiment of the present invention. In this illustrative example, the process in FIG. 12 may be implemented in a memory management process, such as memory management process 400 in FIG. 4 or memory management process 500 in FIG. 5.

The process begins by receiving a request to restore an object to an earlier state (step 1200). This request may be received from an application or a user input. Additionally, the request may be received from another process, such as an operating system or JVM process requiring the object to be returned to some other state. An index and an object identifier are identified from the request (step 1202). The location of the delta object linked list is identified from the object (step 1204). In step 1204, the location of the delta object linked list is identified using the offset from the object header. Thereafter, the object is restored to the earlier state using the delta data in the delta object linked list using the index (step 1206) with the process terminating thereafter.

Figure 13:
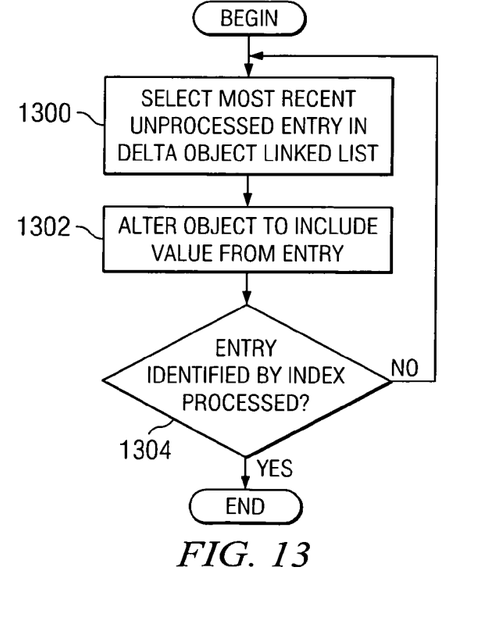
FIG. 13 is a flowchart of a process for restoring an object to an earlier state in accordance with a preferred embodiment of the present invention.

Turning now to FIG. 13, a flowchart of a process for restoring an object to an earlier state is depicted in accordance with a preferred embodiment of the present invention. The process illustrated in FIG. 13 is a more detailed description of step 1206 in FIG. 12.

The process begins by selecting a most recent unprocessed entry in the delta object linked list (step 1300). The object is then altered to include the value from the entry (step 1302). Next, a determination is made as to whether an entry identified by the index has been processed (step 1304). This step determines whether the particular index, such as a timestamp for the object, has been processed. If this entry has been processed, the object has then been returned to the desired state with the process terminating thereafter.

Otherwise, the process returns to step 1300 to select the next most recent unprocessed entry in the delta object linked list. In the instance in which the linked list includes entries for other object, a determination may be included to determine whether the object identifier is for the object that is being restored.

Figure 14:
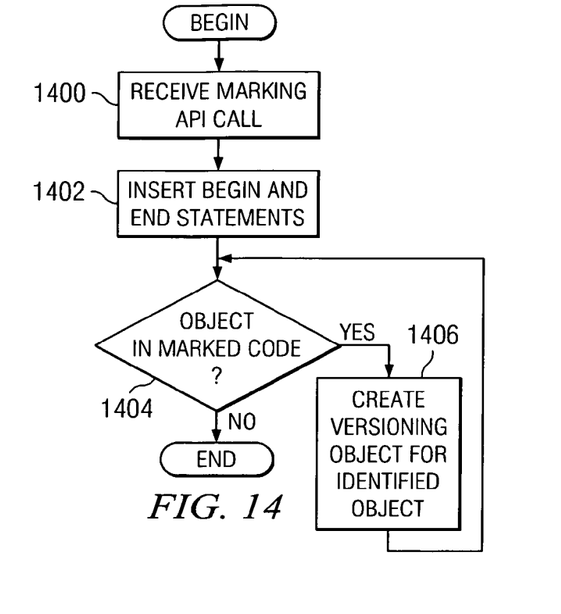
FIG. 14 is a flowchart of a process for marking code for versioning in accordance with a preferred embodiment of the present invention.

Turning now to FIG. 14, a flowchart of a process for marking code for versioning is depicted in accordance with a preferred embodiment of the present invention. The process illustrated in FIG. 14 may be implemented in a memory management process, such as memory management process 500 in FIG. 5.

The process begins by receiving a marking API call (step 1400). This call may be, for example, an API call that includes the name of a class as a parameter. Begin and end statements are inserted in to the code (step 1402). Next, a determination is made as to whether an unprocessed object is present in the marked code (step 1404). If an unprocessed object is present, the object is processed by creating a versioning object for the identified object (step 1406). Step 1406 allows for delta data to be stored during execution of the code. Thereafter, the process returns to step 1404 to determine whether additional unprocessed objects are present. The process terminates when all of the objects in the marked code have been processed.

Figure 15:
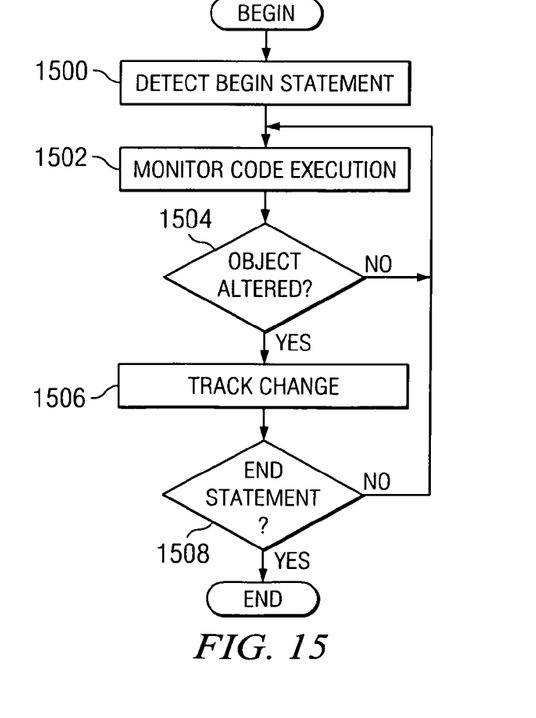
FIG. 15 is a flowchart of a process for tracking changes in data in accordance with a preferred embodiment of the present invention.

With reference to FIG. 15, a flowchart of a process for tracking changes in data is depicted in accordance with a preferred embodiment of the present invention. The process illustrated in FIG. 15 may be implemented in a memory management process such as memory management process 500 in FIG. 5.

The process begins by detecting a begin statement (step 1500). Code execution is then monitored (step 1502). A determination is made as to whether an object has been altered (step 1504). If the object is altered, the change is tracked (step 1506). Next, a determination is then made as to whether an end statement has been encountered (step 1508). If an end statement has been encountered, the process is then terminated.

Turning back to step 1504, if a determination is made that no object has been altered, the process returns back to monitor code execution step 1502. The process also returns to step 1502 if an end statement is not found.

Thus, the present invention provides an improved method, apparatus, and computer instructions for saving delta data and restoring an object to a prior state using the delta data. This mechanism is accessed through API calls to the JVM. In these examples, a data structure containing entries is used to store changes in the data and memory segments. This data structure takes the form of a linked list in these illustrative examples. Of course, other types of data structures may be used, such as, for example, a table. In the depicted examples, the linked list may be a single linked list for all objects being managed by a memory management subsystem. Alternatively, in another embodiment, this data structure may be located as part of the object or in a separate data structure in which each data structure is associated with a particular object that is being managed by the memory management subsystem.

The present invention also allows for marking sections of code for tracking changes to objects in the marked sections. Further, a user may specify a class or set of classes that are to be marked through an application in the form of a user interface.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for marking code for data versioning the method comprising:

responsive to receiving a user input, inserting a first marking statement in the code and a second marking statement in the code, wherein a portion of code between the first marking statement and the second marking statement form a marked section of code;

detecting a change made in data in an object caused by execution of the marked section of code and changes made in data in additional objects changed by execution of the marked section of code; and responsive to detecting the change, tracking the change made in data in the object and the changes made to the data in the additional objects as a version of delta data in a data structure wherein the data structure comprises an index for selecting the version of the delta data, an array index identifying a location of the change within the delta data, and a value indicating the change, wherein the object and the additional objects form a set of objects and wherein each object in the set of objects may be restored to a prior state independently of other objects in the set of objects using a selected version of the delta data.

2. The method of claim 1, wherein the first marking statement and the second marking statement are tags.

3. The method of claim 1, wherein the inserting steps are initiated from a call to a marking application programming interface.

4. The method of claim 3, wherein the application programming interface call is made through a user interface.

5. The method of claim 1 further comprising:

responsive to inserting, determining whether the object is a versionable object; and responsive to a determination that the versionable object is absent, creating the versionable object.

6. A data processing system for marking code for data versioning, the data processing system comprising:

a bus;

a memory connected to the bus, wherein the memory comprising computer instructions;

a hard disk connected to the bus;

a processor connected to the bus, wherein the processor executes the computer instructions to direct the data processing system to:

responsive to receiving a user input, insert a first marking statement in the code and a second marking statement in the code, wherein a portion of code between the first marking statement and the second marking statement form a marked section of code;

detect a change made in data in an object caused by execution of the marked section of code and changes made in data in additional objects changed by execution of the marked section of code; and responsive to detecting the change, track the change made in data in the object and the changes made to the data in the additional objects as a version of delta data in a data structure wherein the data structure comprises an index for selecting the version of the delta data, an array index identifying a location of the change within the delta data, and a value indicating the change, wherein the object and the additional objects form a set of objects and wherein each object in the set of objects may be restored to a prior state independently of other objects in the set of objects using a selected version of the delta data.

7. The data processing system of claim 6, wherein the first marking statement and the second marking statement are tags.

8. The data processing system of claim 6, wherein the processor executes the computer instructions to direct the data processing system to insert a first marking statement in the code and a second marking statement in the code is initiated from a call to a marking application programming interface.

9. The data processing system of claim 6 wherein the processor further executes the computer instructions to direct the data processing system to:

responsive to inserting, determine whether the object is a versionable object; and responsive to a determination that the versionable object is absent, create the versionable object.

10. A recordable-type medium containing computer executable instructions stored thereon for a computer program product for marking code for data versioning, the computer program product comprising:

computer executable instructions, responsive to receiving a user input, for inserting a first marking statement in the code and a second marking statement in the code, wherein a portion of code between the first marking statement and the second marking statement form a marked section of code;

computer executable instructions for detecting a change made in data in an object caused by execution of the marked section of code and changes made in data in additional objects changed by the execution of the marked section of code; and computer executable instructions, responsive to detecting the change, for tracking the change made in data in the object and the changes made to the data in the additional objects as a version of delta data in a data structure wherein the data structure comprises an index for selecting the version of the delta data, an array index identifying a location of the change within the delta data, and a value indicating the change, wherein the object and the additional objects form a set of objects and wherein each object in the set of objects may be restored to a prior state independently of other objects in the set of objects using a selected version of the delta data.

11. The recordable-type medium of claim 10, wherein, in the computer program product, the first marking statement and the second marking statement are tags.

12. The recordable-type medium of claim 10, wherein, in the computer program product, the computer executable instructions for inserting are initiated from a call to a marking application programming interface.

13. The recordable-type medium of claim 12, wherein, in the computer program product, the application programming interface call is made through a user interface.

14. The recordable-type medium of claim 10, wherein the computer program product further comprises:

computer executable instructions, responsive to inserting, for determining whether the object is a versionable object; and computer executable instructions, responsive to a determination that the versionable object is absent, for creating the versionable object.

* * * * *